United States Patent [19]

Beckerman et al.

[11] Patent Number: 5,139,845
[45] Date of Patent: Aug. 18, 1992

[54] HIGH STRENGTH, LIGHT WEIGHT STRUCTURAL COMPOSITE AND METHOD OF PREPARING SAME

[75] Inventors: Norton S. Beckerman, Arlington, Va.; Tom Endres, Seattle, Wash.; Peter Bowthorpe, Jacksonville, Fla.

[73] Assignee: Utilities Products International Inc., Falls Church, Va.

[21] Appl. No.: 578,532

[22] Filed: Sep. 7, 1990

[51] Int. Cl.$^5$ .................................................. B32B 3/00
[52] U.S. Cl. ........................................ 428/117; 264/255; 404/46; 428/119; 428/192; 428/537.1
[58] Field of Search ............ 428/116, 117, 119, 537.1, 428/192; 404/46; 264/255

[56] References Cited

U.S. PATENT DOCUMENTS

| | | | |
|---|---|---|---|
| 2,839,442 | 6/1958 | Whitaker | 428/116 X |
| 3,298,892 | 1/1967 | Lippay | 428/53 |
| 3,325,037 | 6/1967 | Kohn et al. | 428/119 X |
| 3,376,185 | 4/1968 | Shook et al. | 428/259 X |
| 3,487,489 | 1/1970 | Kuhns | 404/21 X |
| 3,616,111 | 11/1971 | Raechs, Jr. | 428/52 |
| 3,901,993 | 8/1975 | Phillips, Jr. | 428/148 |
| 3,905,172 | 9/1975 | Blackburn | 52/741 |
| 4,209,486 | 6/1980 | Ross | 264/279.1 X |
| 4,271,649 | 6/1981 | Belanger | 428/537.1 X |
| 4,343,846 | 8/1982 | Kohn | 428/537.1 X |
| 4,533,589 | 8/1985 | Sewell | 428/174 |
| 4,801,483 | 1/1989 | Beckerman et al. | 428/71 |
| 4,801,589 | 1/1989 | Smith et al. | 514/291 |

FOREIGN PATENT DOCUMENTS

793014  8/1968  Canada .

Primary Examiner—Henry F. Epstein
Attorney, Agent, or Firm—Anthony J. DeLaurentis

[57] ABSTRACT

A light weight structural composite comprised of a cellular core having high dynamic load-bearing properties and a fiber reinforced resinous skin, the panel further comprised of an internally disposed elastomeric membrane which covers the core and acts to disperse shock waves created from impact loads.

25 Claims, 5 Drawing Sheets

FIG_4a

FIG_4b

FIG_4c

FIG_4d

FIG_4e

HIGH STRENGTH, LIGHT WEIGHT STRUCTURAL COMPOSITE AND METHOD OF PREPARING SAME

BACKGROUND OF THE INVENTION

This invention relates generally to structural composites and, more particularly, to structural composites formed from a fiber reinforced resinous material that is fused to a cellular core material, to provide a light weight, monolithic composite panel of exceptionally high impact strength and load bearing capabilities. The invention also relates to the process for constructing such composites.

Typically, resinous composites are formed by curing a mass of reinforcing fibers coated with one of several resinous matrix materials, such as polyester or epoxy resins. The reinforcing fibers and resinous materials are combined in such a way as to assimilate the materials as much as possible. That is, the fiber material and the resin matrix material are blended or intermixed into a substantially homogeneous mass such that when the resin matrix material is cured or hardened, the intermixed materials are integrally bonded or fused together, hence producing a reinforced fiber material. When formed in the shape of a usable part or structure and allowed to cure into an integrally bonded or fused mass, such reinforced fiber material is referred to as a composite. Composite parts of this type are commonly formed using known technology.

There are a variety of resinous matrix materials, as well as fibers, that have been used in the production of fiber reinforced composites, the selection of the various possible materials generally being dictated by the desired end use, or application, of a given composite. Typically, glass, carbon, boron, metal or polymeric fibers, such as polyester or polyamide (nylon) fibers, are used as the reinforcing fibers. These fibers may be used in a variety of configurations, for example, in the form of rovings, tapes, mats, woven and non-woven webs, tapes, or the like. The resins which are used as the matrix materials normally comprise various heat hardenable epoxies, phenolics, nylons, polyesters, polyurethanes or polysulfides. The materials are well known and are readily available in commerce.

Reinforced fiber composites are well known materials suitable for use in a wide variety of industrial, commercial and structural applications. Generally, such composites are relatively strong and having unusual load bearing strength in relation to their weight, particularly when formed in the shape of a structural member such as a channel ("[") or I-beam.

There are a number of known non-metallic cored composite structures, some of which utilize end-grain, balsa-wood materials. Light weight, cored composite parts are widely used to withstand static loads as floor beds for railroad cars, shipping containers, cargo pallets and helicopter pads, or as dividing structural members such as bulkheads, doors, reefer bodies, etc. These materials are also employed for structural insulation in aircraft applications, in housing and in boating where bulk with minimum weight is required. In essence, they are characterized by their ability to withstand static loads or as structural members. Conversely, they are not characterized by their ability to withstand excessive impact loads without structural support. Examples of such structural members and composite materials are those described in U.S. Pat. Nos. 3,298,892; 3,325,037; 3,376,185; 3,487,489; 3,616,111; 3,901,993; 3,905,172; 4,209,486; 4,271,649; 4,343,846; 4,533,589; and Canadian patent 793,014.

Recently, in U.S. Pat. No. 4,801,483, there was disclosed a fiber reinforced composite which is able to successfully withstand and respond to a moving, concentrated, impacting shock of excessive weight, such as a 20 ton per square foot impact load, without some type of reinforcing support, such as the ground or roadway surface. The composite product disclosed in that patent is a light weight, high strength trench cover used to span holes or openings (supported two sides only) on surfaces carrying vehicular traffic of all types and weight, some of which may very well exceed 40 tons.

In addition to the use of reinforcing fibers and resin matrix materials, the composite product disclosed in U.S. Pat. No. 4,801,483 included a non-fiber reinforcing agent, such as end-grain, balsa-wood blocks as a core material. End-grain balsa-wood is a particularly useful core material for preparing composites parts characterized by exceptionally light weight and high load bearing strength, since it is dimensionally stable and has a cell structure which affords a combination of high rigidity, and compressive and tensile strength that is superior to other materials of comparable density. In the composite disclosed in U.S. Pat. No. 4,801,483, a combination of end-grain balsa-wood blocks and matrix resins form a core that is "bonded on all surfaces" to a reinforced fiber/resin matrix shell. The balsa-resin core is bonded to the reinforced fiber/resin matrix shell so that the shell and the core move together as one (in complete unison) under load, and form a light weight panel that not only can support excessive static loads, but that can also withstand excessive impact loads. In the patented composite product, it is the core structure, and the way in which it adheres to the surrounding reinforced fiber/resin matrix shell, that allows the panel to go from an immobile, unshocked state to a state where immediate response to a moving, irregular impact load, of as much as 20 tons per square foot, is required.

The composite product disclosed in U.S. Pat. No. 4,801,483, was developed as a safer, more economical alternative to the use of one inch thick steel plating as a cover for holes, trenches or openings in a roadway surface. The weight relationship of one (1) square foot of one inch steel plate to one (1) square foot of the patented composite plate is 6.7 to 1, whereas the deflection, under maximum point load, of approximately 0.90 inches, is the same for both the steel plate and the patented composite plate.

The patented composite is generally sold as a plate measuring 5 feet wide×6 feet long and weighing 182 lbs., and being rated for street and highway use. The primary advantages of the patented plates are:

1. They are non-corrosive and will not be affected by roadway chemicals, salt or water.

2. Their handling requires no special crews or equipment such as flat bed trucks, loaders, or boom trucks and the crews necessary for their operation.

3. Because of their light weight and ease of handling the plates require less time when opening and closing a hole. Based on crew size actual manhour savings could be substantial.

4. In off hours or during emergency situations the plates can be distributed quickly and easily to a problem area and installed by a repair crew.

5. Because of their light weight and design the plates are much safer to use than steel road plates for both the craftperson working on the job site and vehicular traffic moving near or over the job site.

6. The plates are much less expensive to use than steel roadway plates. A recent study conservatively estimated the handling cost of steel to be $28.64 per linear foot. The cost of the lighter weight patented plating was estimated to be $3.20 per linear foot; a difference of $2544.00 per 100 feet of plating. This study did not consider either the reduced cost of accident claims or the cost of non-productive crew time during the plating operations.

Until the development of the plate described in U.S. Pat. No. 4,801,483, there was not a light weight, load bearing product having high impact strength that was commercially available as a replacement for steel plating as a ground opening cover. However, because of its limited strength to weight characteristics and the molding process currently necessary for its production, the patented plate has a number of disadvantages that limit its utility and, therefore, its acceptibility in the market place. For example, the patented plates:

1. have a strength to weight relationship that:
   (a) requires a material thickness of 2" to safely carry a 41,600 lb. axle load over a span of 4 ft.; a ratio of $\frac{1}{2}$" to 1 ft.
   (b) requires a substantially increased, and disproportionate, material thickness to safely carry a 41,600 axle load over a span in excess of 4 ft. For example, to span a hole of 6 ft. the patented panel would require a thickness of approximetely 4 inches; a ratio of $\frac{3}{4}$" to 1 ft.

2. are too thick to permit their use, on 4 ft. spans, in areas having vehicular traffic that moves at speeds in excess of 35 miles per hour.

Thus, while the composite roadway plates, disclosed in U.S. Pat. No. 4,801,483 represent a considerable advancement over the prior art, with their current weight to strength ratio the plates must be made too narrow to be used as an effective replacement for steel plating, and if made wider would be too thick to be safely used on a surface carrying vehicular traffic.

SUMMARY OF THE INVENTION

In an effort to overcome the strength to weight limitations of existing composite plate structures, including the structures described in U.S. Pat. No. 4,801,483, the applicants have developed (1) a unique core structure, (2) a process of bonding that core structure to fiber reinforced materials, and (3) a method of manufacture, that when combined, permits the construction of light weight, load bearing panels having an impact strength which is significantly greater than that of existing panels.

Thus, a primary object of this invention is to provide an improved load bearing structural composite panel of reduced weight, and significantly increased impact strength.

Another object is to provide a substantially monolithic composite panel, resistant to significant and continuous vibration, having a high strength, low density core and a rigid, tough skin which is resistant to abrasion and penetration.

Another object is to provide a composite panel having an internally disposed elastomeric membrane that acts to disperse shock waves created from impact loads, and doing so in such a way as to allow the construction of a substantially monolithic structure.

Yet another object of this invention is to combine and thus take advantage of the unique strength characteristics of end-grain balsa-wood and pultruded shapes in such a way as to produce a core structure having a significantly enhanced weight to strength ratio.

Yet another object is to provide a composite panel of the above type which is particularly adapted for use as a ground opening cover or deck in a surface, such as a roadway or bridge, carrying vehicular traffic.

Still another object is to provide a structural panel comprised of a fiber reinforced resinous skin material, and a core material, wherein the skin and core are so intimately fused together as to function as a monolithic mass.

Another object is to provide a technique for manufacturing light weight, exceptionally high strength structural panels of the above type, particularly as it relates to the use of a unique cellular core structure.

Still another object is to use to better advantage, in terms of the size of the part produced and the speed of the production process, current molding techniques, such as reactive injection molding and conventional compression molding, for producing light weight, high strength structural panels.

Yet another object is to produce light weight, high strength structural panels that are tailored to a specific application, such as, for example trench covers, manhole covers and bridge decking. In connection with this object it will be noted that each of the above-named panels would cover some type of ground opening in a surface that carries vehicular traffic; yet, the types of external forces and pressures that would impact each panel are substantially different. For optimum performance results, therefore, each application should have a different structural panel, i.e., one specifically designed and constructed to handle the specific forces encountered in that application.

Briefly stated, these and other objects and advantages are accomplished by a multi-step process wherein a low density, high strength core structure, and interfacing membrane, are integrally bonded within a fiber reinforced shell to form a monolithic mass in the shape of a structural panel. In one aspect of the invention, the panel is formed upside down in a suitably configured mold by building up a series of fiber reinforced skin layers that will ultimately form the top section of the panel. An elastomeric membrane of compatible materials is then formed over the surface of the fiber reinforced skin layers. Thereafter, an elastomer skin-covered, cellular core structure which is void of air pockets, entrapped or occluded air, is positioned on the exposed surface of the fiber reinforced, membrane covered, skin layers. Next, an elastomeric membrane of compatible materials is formed over the complete surface of the positioned core structure. A second series of fiber reinforced skin layers, that will ultimately represent the bottom section of the panel, is then formed over the membrane encased core structure. The first layers of resin-fiber reinforced skins (top), the elastomeric membrane, the cellular core member (center) and the second layers of the resin-fiber reinforced skins (bottom) are then integrally fused, or assimilated, to each other so as to form an essentially monolithic mass which is completely free of any voids, or entrapped or occluded air, and which contains an elastomeric skin-encased cellular core.

The cellular core structure that is used in the process of this invention can be made on site during the course of preparing a completed or final composite panel. However, as a convenient and often important alternative, the core structure can be made separately, at any time and at any location, prior to the preparation of the final composite panel. The core structure uses resin coated or impregnated cellular core members, such as extruded or pultruded metal, wood or resin honeycomb or other cellular or formaminous shapes. A preferred core member comprises wood shapes, particularly balsa-wood shapes, such as end-grain balsa-wood blocks, contained in a frame structure. The frame structure may comprise, for example, a plurality of simple or complex extruded or pultruded frame parts or members having the shape of, for example, a channel ("["), an I-beam, or the like. Once produced, and at any time thereafter, the elastomeric skin-covered core structure can be used as a component for preparing the herein-described panels.

BRIEF DESCRIPTION OF THE DRAWING

The invention will be understood more fully by reference to the following detailed description of specific embodiments thereof, particularly when taken in conjunction with the drawings wherein.

DESCRIPTION OF THE INVENTION

In one preferred form of the invention, a structural panel having a generally square, rectangular, circular or other preselected configuration, and comprising a cellular core structure, is produced such that the panel and the process for its manufacture are characterized as follows:

(1) the cellular core structure of the panel is constructed outside of the mold in which the complete panel is formed;

(2) the external surfaces of the cellular core structure are comprised of an elastomeric skin;

(3) the internal structure of the core is comprised of reinforcing fibers, resin matrix material, discrete balsa-wood blocks or shapes, and various frame parts;

(4) the balsa-wood shapes are saturated with resin matrix material such as a polyester, vinylester or epoxy resin material, which is allowed to cure, whereafter the shapes are re-saturated with the same resin matrix material;

(5) the various frame parts are constructed of fibers and matrix resins and can be formed in a variety of shapes including channel members whose flanges face inwardly toward the mass of balsa-wood blocks and are level with the surface of the balsa-wood blocks, I-beams which can be used as separating rib members whose flanges are level with the balsa-wood blocks they separate, and the like;

(6) the frame parts are covered with the same resin matrix material as are the balsa-wood shapes;

(7) the balsa-wood shapes and the mating surfaces of the frame parts interface each other in such a manner as to prevent voids, open spaces, or entrapped air; and (8) the top and bottom surfaces of the balsa-wood shapes form a continuation of the top and bottom surfaces of the frame parts;

In this preferred embodiment, an initial layer or layers of fiber reinforced/resin matrix skin is formed. This initial skin layer ultimately will form the top layer of the completed panel. Accordingly, the skin is formed in a suitably configured mold, preferably one that is provided with cavities or depressions which define a raised, anti-skid tread design on the exposed outer surface of the completed panel. Next, a free flowing elastomeric compound is used to evenly and completely cover that portion of the exposed area of the initial layers of resin-fiber reinforced skin that is to contact the cellular core structure, and a separately prepared core structure is firmly positioned in the free flowing elastomeric compound such that its edges are spaced from the side walls of the mold and the end of the composite panel being formed. Normally the core structure occupies about 60 to about 95% of the area of the mold and the peripheral edges of the core structure are spaced from the edges of the mold anywhere from about 1 inch to about 20 inches. The completed core structure is then covered on all exposed surfaces (top and sides), with the same elastomeric compound that is used to coat in initial skin layers in such a manner as to prevent open spaces, voids, or the entrapment of air between the core structure and the elastomeric compound, or within the elastomeric compound itself. Next, a second layer or layers of fiber reinforced skin is formed over the elastomeric compound covering the core structure and over any exposed surfaces of the initial skin layer so that all surfaces touch and so that no voids or entrapped air remain between any of the contacting surfaces. This second skin layer forms the bottom layer of the completed panel.

The fiber reinforced skins are prepared by laying-up a fiberous roving, mat, or web, or the like, with a hardenable resin. A variety of conventionally employed fiberous and resinous materials may be used, but in preferred aspects, the fibrous materials comprise glass, aramid, boron or carbon fibers, mats, tapes, rovings or the like, and the hardenable resins comprise filled or unfilled epoxies, polyesters, phenolics or vinylesters.

The various fiber reinforced skins layers are chemically fused, hardened or cured under heat and pressure, or are catalytically hardened using hand lay-up, reactive injection molding or conventional compression molding techniques, such that the various skin layers totally encapsulate the core structure and form a monolithic structure having an unusual strength to weight ratio.

The frame parts preferably are formed by pultrusion techniques and generally are comprised of glass, boron, carbon, aramid, or the like fibrous reinforcing materials in a resin matrix comprised of filled or unfilled epoxies, polyesters, phenolics, vinylesters or the like. The pultruded parts generally have a wall thickness of between 1/32 and ¾ inches, and in the case where the pultruded parts are shaped in the form of a channel member of I-beam or other shape having upper and/or lower horizontal walls, i.e., flanges, the thickness of each such flange shall not exceed about 25% of the height of the vertical walls of the pultruded parts.

The elastomeric compounds that are used in the composite structure as the membrane material for encasing the core structure and for coating the surfaces of the fiber reinforced skins which contact the elastomeric membrane-encased core structures may be the same or different compounds, although it is preferred that the same compounds be used in any given panel to ensure complete compatibility. The elastomeric compounds may be selected from a wide variety of commercially available materials. For example, the elastomeric compound may comprise polyvinyl chloride; polyvinyl acetate; polyvinybutyral; various vinyl copolymers, such as polyvinyl chloride-polyvinylidine chloride copolymers; various rubbers, such as styrene-butadiene, butyl, neoprene, silicone, ethylene-propylene copolymers and terpolymers or the like; or elastomeric polyurethanes to name a few. More than one elastomeric compound may be used as a blend, and the compounds may be filled, for example, with finely divided silica, or unfilled. In this regard, it will be noted that the identity of the elastomeric compound is not especially critical to the invention, so long as the elastomeric material can be bonded to both the cellular core members and the fiber reinforced skin layers without the inclusion of voids, open spaces or entrapped air. Stated differently, it is the presence of the shock-tolerant elastomeric compound at the interface between the core and the skin portions of the composite panels, rather than the identity of the elastomeric compound, which is essential to the present invention.

Typically, silicon, silane coated or uncoated borosilicate glass, carbon, boron, or polymeric fibers, such as polyester or polyamide (nylon) fibers, are used as the reinforcing fibers. The fibers, for example, can be used in the form of strands (braided or unbraided), rovings, mats, tapes, woven and unwoven webs, or the like.

The resins which are used as the matrix materials, normally comprise various heat hardenable epoxies; phenolics; nylons, such as that sold by Nylon Corporation under the designation NYCO A4115; vinylesters, such as that sold by Goodrich Chemical Company under the designation Geon 8700A; polyesters; polyurethanes; polyvinyls, such as POLYVIN 6614, sold by Shulman Plastics; polysulfides, such as Thiokol B, sold by Thiokol Corporation; and polysulfones, such as Mindel A-650, sold by Union Carbide. These materials are well known and are readily available in commerce.

Figure 2:
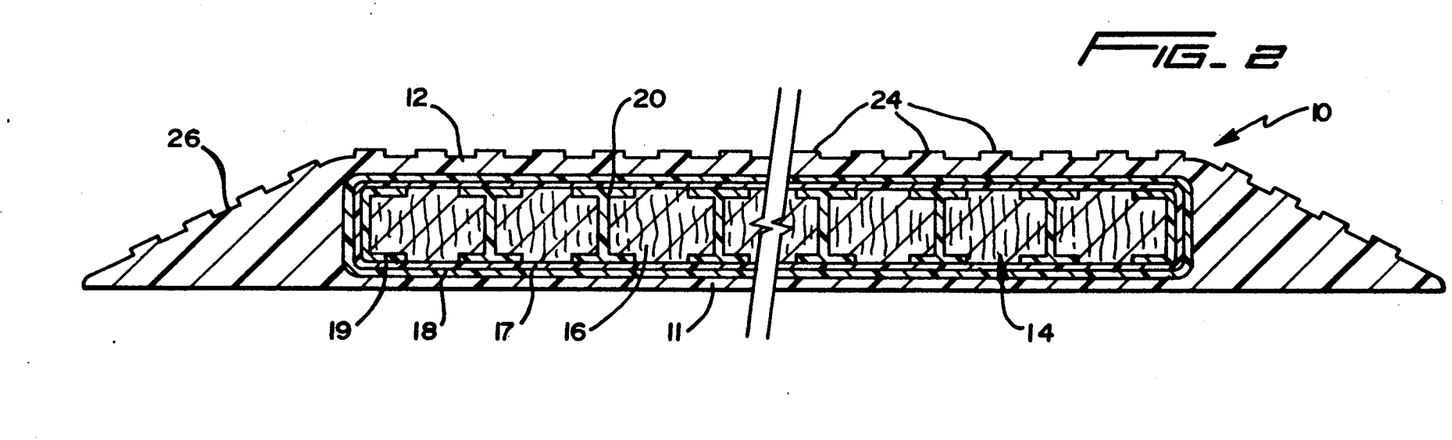
FIG. 2 is a schematic sectional view taken along line 2—2 of FIG. 1, with portions removed for the purpose of illustration, illustrating the fiber reinforced resin matrix skin layers and the elastomeric membrane coated core structure of the panel.
Figures 3, 3A:
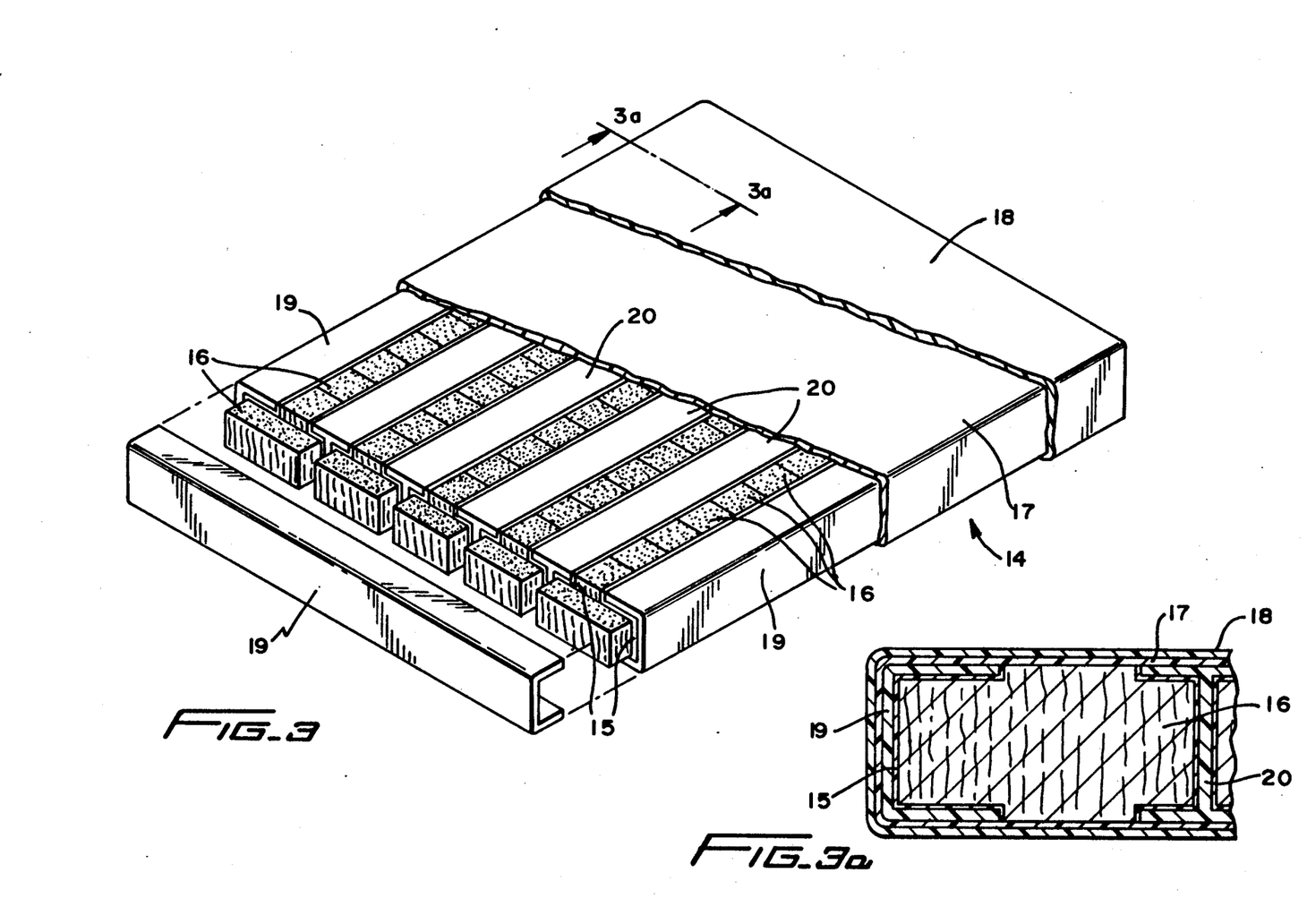
FIG. 3 is a partially exploded perspective view of the elastomeric membrane-encased core structure of the panel of FIG. 1, wherein the top elastomeric membrane layer and the underlying fiber reinforced resin layer have been partially cut away to expose a spaced array of cellular core members, and fiber reinforced resin frame parts.
FIG. 3a is an enlarged sectional view taken along line 3a—3a of FIG. 3.
Figure 4A:
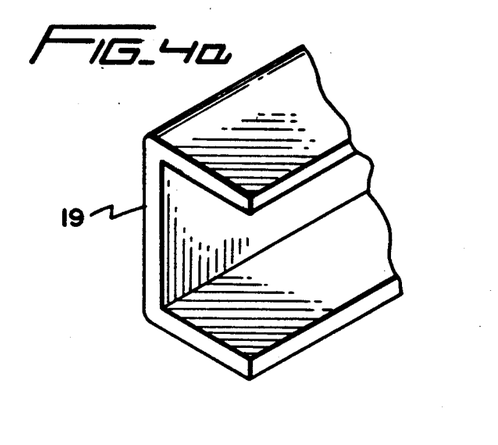
FIGS. 4a, 4b, 4c, 4d and 4e are partial perspective views of various alternative frame parts, wherein the parts are in the form of a channel member (FIG. 4a), an I-beam (FIG. 4b), an I-beam prepared by bonding two channel members back-to-back (FIG. 4c), an elongated rectangular rib (FIG. 4d), and a strut-supported I-beam (FIG. 4e), respectively.
Figure 4B:
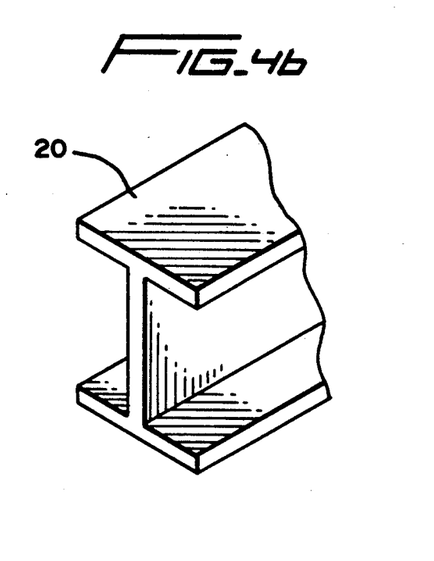
Figure 4C:
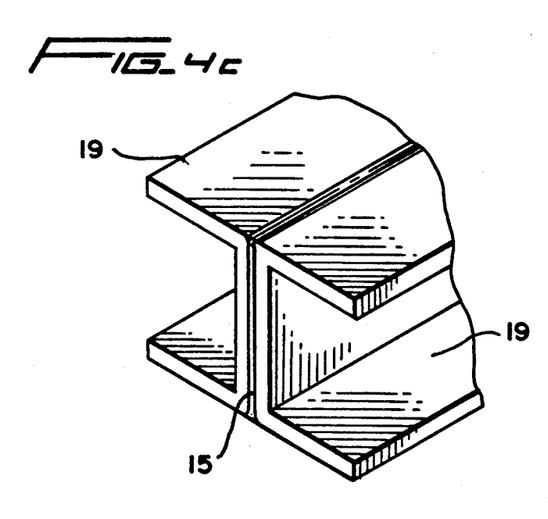
Figure 4D:
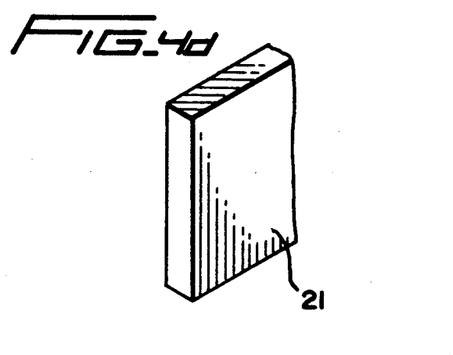
Figure 4E:
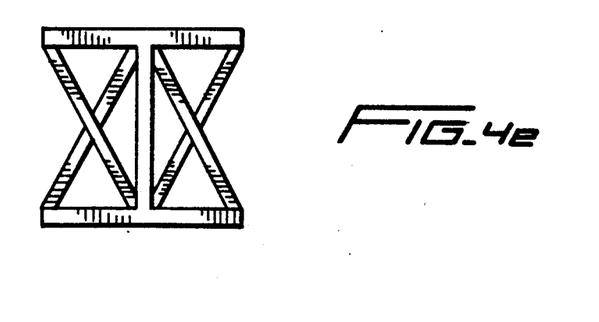

Referring now to the drawing, there is shown a structural composite panel 10 in accordance with the invention. As shown most clearly in FIGS. 2, 3 and 3a, the composite panel 10 consists of a fiber reinforced lower resinous skin layer 11, a fiber reinforced upper resinous skin layer 12 and a membrane of elastomeric material 18 which are all integrally fused to a core structure 14 which, in turn, is comprised of a spaced array of cellular core members, such as balsa wood blocks 16, that are covered by a fiber reinforced resin skin 17 and an outer elastomeric membrane or coating 18. The blocks 16 are arranged in a frame structure comprised of peripheral channel-shaped members 19 (FIG. 4a) and I-beam-shaped rib members or separators 20 (FIG. 4b). Both the channel-shaped peripheral members 19 and the I-beam-shaped rib members 20 may be made by pultrusion or otherwise from a fiberglass reinforced resin matrix. As shown in FIG. 4c, the I-beam-shaped rib members 20 may be formed by bonding two channel members back-to-back by means of a suitable adhesive or by coating the opposing backs of the channel members with the same resin 15 that was used as the resin matrix material for the channel members, followed by heat curing or otherwise chemically fusing the two members together. The I-beam shaped rib members 20 may also be replaced with rib members having a rectangular (FIG. 4d) or other suitable shape.

Figure 1:
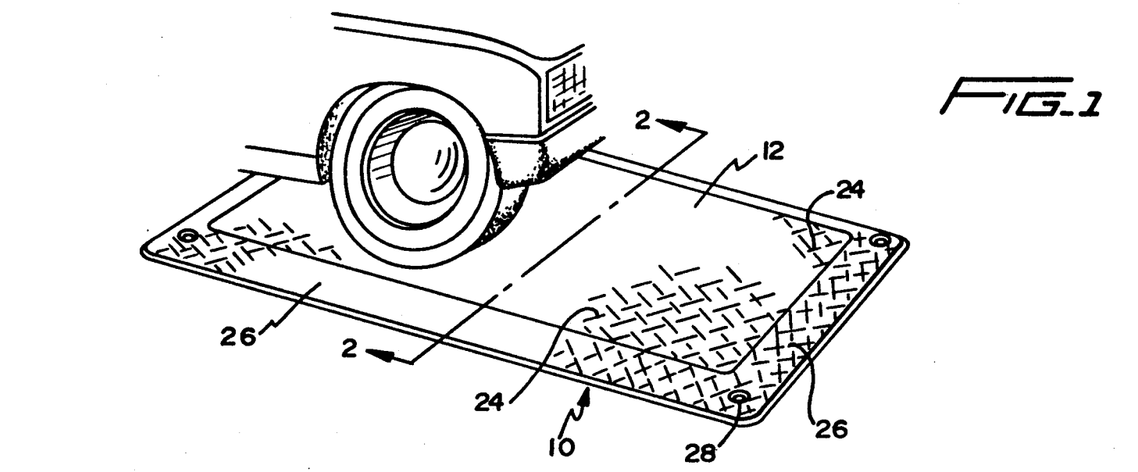
FIG. 1 is a partial perspective view illustrating a composite structural panel in accordance with the present invention, wherein the panel is being used as a roadway opening cover.

The panel 10 may be prepared in a suitably configured mold 22 (FIGS. 7–10) such as square, rectangular or circular mold having depressions 23 in the surface thereof which correspond to anti-skid tread projections 24 (FIGS. 1 and 2) which are formed on the upper skin layer 12 of the panel 10. The mold 22 may also be provided with suitably tapered side walls 25 such that the completed panel 10 will have one or more tapered edges or side walls 26 (FIG. 1). Methods of molding that can be used include, for example, (1) hand lay-up molding, (2) reactive injection molding and (3) conventional compression molding, although (2) reactive injection molding is the preferred method.

Referring to FIGS. 7–10, the panel 10 is formed by first applying a release coat to the inner mold surfaces to facilitate clean removal of the finished panel therefrom. While numerous different release materials may be used for this purpose, the use of polyvinyl alcohol and various waxes as the release material is preferred. Suitable waxes include Carnauba-based waxes, such as those marketed by Ceara Products, Inc. under the tradename CEARA, and that marketed under the trade designation Meguiar's Mirror Glaze.

After the release coat has been applied, a gel coat may be sprayed, brushed, or otherwise applied to the release coat to a uniform thickness of about 5 to 30 mils, preferably from about 5 to 15 mils, and allowed to set or gel. The gel coat may be, for example, a polyester gel coat that will cure to a hard, scratch and penetration resistant finish. Suitable polyester gel coats include those marketed by USX Co., Plastics Division, under the trade name 12580, and by Ram Chemicals under the trade designation RAM 66.

Such gel coat materials have a gel time, or setting time on the order of 5-15 minutes at 80 F. when catalyzed with a 1.5% solution of methyl ethyl ketone peroxide catalyst. After the gel coat has gelled, i.e., the resin has partially cured to a substantially non-tacky state in which no resin adheres to the fingers when drawn over the gel coat, it should be allowed to further polymerize, i.e., cure, at a temperature between about 50 F. and about 180 F., preferably between 75 F and 130 F., for an additional 20-25 minutes. At this point, the depressions 23 in the mold surface which correspond to the raised tread pattern or projections 24 on the upper skin layer 12 of the panel 10 are filled with a high strength fiberglass filled resin putty, preferably a putty that is also filled with finely divided silica.

A suitable putty may be prepared by filling a polyester resin, such as that marketed by USX Corporation under the trade name 12580 with chopped fiberglass and with a finely divided silica, such as those marketed under the trade designations CAB-O-SIL or AER-O-SIL, respectively. After the resin putty has been allowed to set for about 10-20 minutes, a resin layer, which is preferably of the same composition as the resin used to prepare the resin putty, is then applied over the bottom of the mold and over the tread projections 24 formed from the fiberglass filled resin putty. The resin layer should be on the order of about 5-20 mils thick and may be applied by brushing, spraying or the like. Forced air, e.g., from a forced air knife, or other suitable means may be used to smooth the resin layer.

Prior to curing the resin layer, one or more layers of fiber reinforcing material should be layed-up to form the skin layer 12. The fiber reinforcing material may comprise a web, a mat, tape, roving, sheeting or the like made of, for example, metal, glass, boron, plastic, or carbon fibers. In preferred embodiments of this invention, the fiber reinforcing material will comprise fiberglass matting and fiberglass roving layed-up in a plurality of layers, e.g., three layers, wherein the first layer comprises a 1.5 oz. per square foot fiberglass matting, wherein the second layer comprises 36 oz. per square yard fiberglass roving, and wherein the third layer comprises another 1.5 oz. per square foot fiberglass matting.

The fiberglass matting may be of the type that employs a readily soluble polyester binder and which is available commercially, for example, from PPG Industries under the trade designation No. 15225-38020. The fiberglass roving may be of the type which is treated with a silane coupling agent to ensure integral bonding with the resin matrix material. Roving of this type is available commercially, for example, from Marine Fiberglass under the trade designation No. 3673.

Preferably, a layer of resin is brushed, sprayed, squeeged, or otherwise applied, on each layer of the fiberglass reinforcing material to ensure that the reinforcing material is completely impregnated and to avoid the formation of air pockets, or other types of occluded air, in the final panel.

After the reinforcing matrix has been layed-up, the resin matrix is cured at a temperature of about 50 F. to 150 F., preferably from about 70 F. to about 130 F. thereby completing the formation of the upper skin 12. The upper skin thickness may vary, but the thickness normally will be from about $\frac{1}{8}$ to about $\frac{1}{4}$ inch.

After the upper skin layer 12 has been formed, and all flashing has been removed, it is ready to be joined to a separately prepared core structure 14.

The core structure 14 may comprise a variety of light weight, high strength materials. However, the core structure 14 preferably is comprised of a single or multiple layer of end-grain, balsa-wood blocks 16 in a spaced array, framed in a fiber reinforced pultruded material, having the shape of a channel member 19 ("["), and using pultruded separator ribs 20 shapes of the same material. As discussed above, the pultruded shapes may be in the shape of a channel member, an I-beam, an elongated rectangular member, or any other suitable shape which imparts high strength to the panel. The core structure also comprises a fiber reinforced resin matrix skin layer 17 (FIGS. 3 and 3a) which completely covers the framed array of balsa wood-blocks 16 and an elastomeric membrane or skin layer 18 which completely covers or encases the fiber reinforced resin matrix skin layer 17.

Figures 5A, 5B, 6:
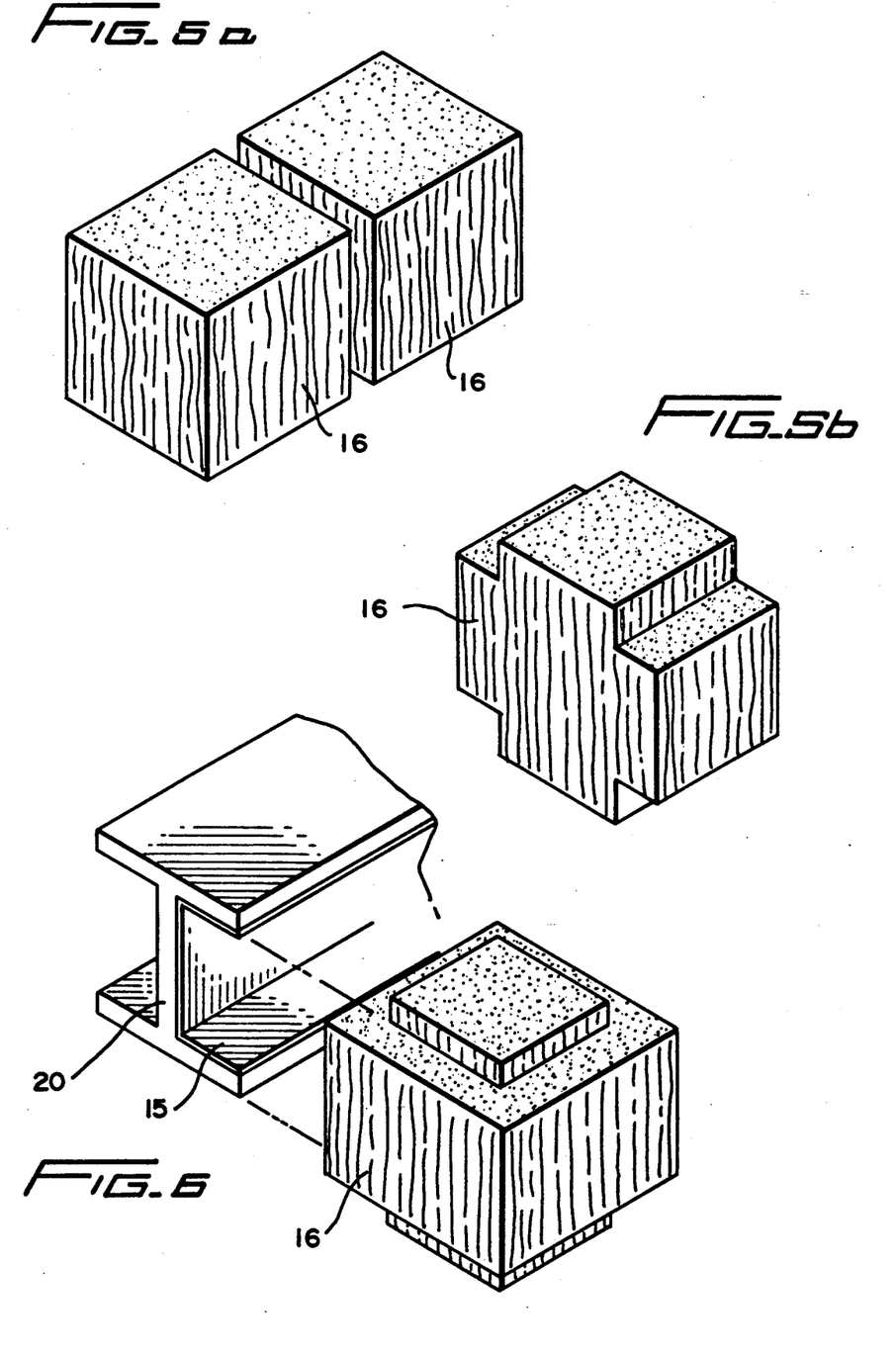
FIG. 5a is a perspective view of two end-grain balsa wood blocks positioned adjacent to each other as they would be in a core structure prepared in accordance with the present invention.
FIG. 5b is a perspective view of a balsa wood block cut to fit in a channel-shaped or I-beam-shaped frame part.
FIG. 6 is an exploded partial perspective view of a precut balsa-wood block being inserted between the flanges of an I-beam-shaped frame part.
Figure 7:
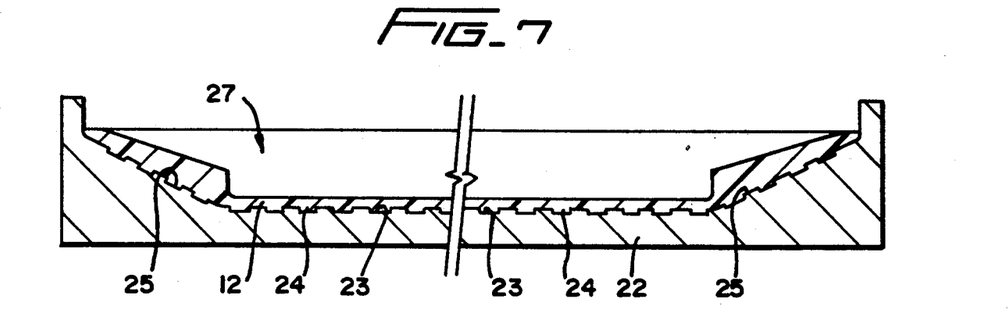
FIG. 7-10 schematically illustrate various successive steps of a process of this invention whereby an elastomeric membrane-encased core structure and a fiber reinforced skin are formed into a monolithic composite structure.
Figure 8:
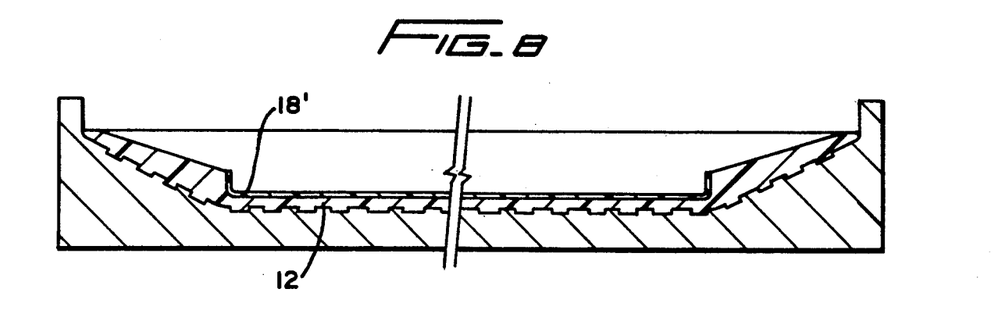
Figure 9:
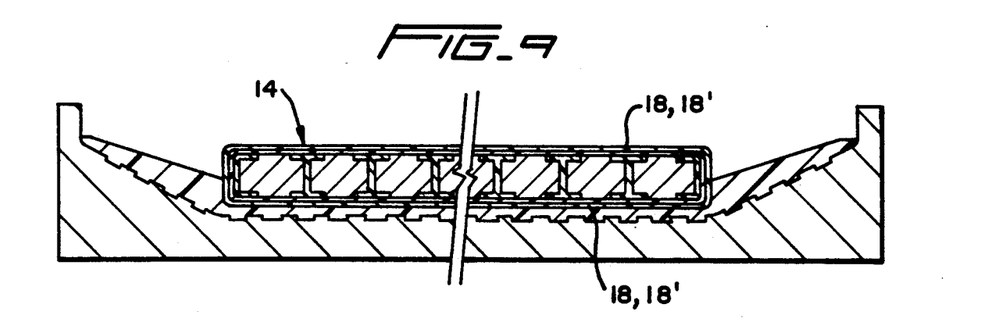
Figure 10:
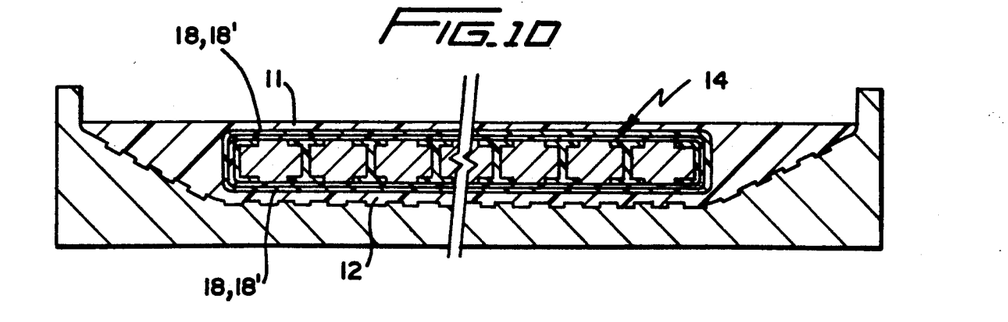

When using balsa-wood blocks, the blocks 16 can be of any shape, but should be pre-cut so that the maximum length dimension at its outside point is no less than about $\frac{1}{4}$ inch and no greater than about 4 inches, the maximum width dimension at its outside point is from about $\frac{1}{4}$ inch to about 4 inches, and the maximum thickness at its outside point of from about $\frac{1}{4}$ inch to about 4 inches. As illustrated in FIGS. 5a and 5b, the blocks 16 generally are cube-shaped and may be notched to fit between the flanges of the channel members 19 and I-beam members 20. However, the use of notched blocks (FIG. 5b) is preferred since they facilitate to avoidance of voids or entrapped air in the completed panels.

In one preferred embodiment, the core structure 14 may be formed by first preparing a planar support surface whose area is approximately 25% larger than the area to be occupied by the completed core structure by wiping the area clean of foreign bodies, dirt, dust or grease and then applying a release coat. While numerous different release materials may be used for this purpose, the use of a polyvinyl alcohol and various waxes as the release material is preferred. Suitable waxes include Carnauba-based waxes, such as that marketed by Ceara Products, Inc. under the tradename CEARA, and that marketed under the trade designation Meguiar's Mirror Glaze.

A layer of fiber reinforcing material, such as 1.5 oz. per square foot matting, is then placed on the prepared support surface so that it overlaps the perimeter of the area to be occupied by the completed core to an extent that when folded upward it will completely cover the vertical walls of the framed balsa-wood blocks of the core but will not overlap onto the top surface thereof.

The fiber mat is then impregnated with a curable resin such as a polyester, epoxy or vinylester resin. A preferred resin would be a polyester resin such as that manufactured by USX Co. under the trade name of No. 12580.

Frame members, such as pultruded fiberglass reinforced resin members having the shape of a channel 19, would then be used as a frame around the outside of the balsa-wood blocks 16, and I-beams 20, preferably pultruded fiberglass reinforced I-beams, would be used as structural ribs or dividers between rows or columns of balsa-wood blocks 16. These pultruded members 19 and 20 should have a wall thickness of between about 1/32 of an inch and about $\frac{1}{4}$ inches, and a height of between about 18/32 and about 5 inches The length of each the channel member 19 should extend the full distance of the balsa-wood blocks 16 which it frames and, preferably should extend about 1/32 of an inch or so beyond the end of the blocks, so that a sufficient length of each channel member is available to meet with a like channel member joining it at an angle of between about 30 degrees and 120 degrees. The length of the I-beam members 20 should be such as to extend the full column or row length of the balsa-wood blocks 16 to enable them to be accurately joined with the pultruded channel members 19 which frame the perimeter of the balsa-wood blocks.

The pultruded frame members i.e., the channel members 19 and rib members 20, would be made using standard pultrusion techniques, and would be comprised of fibers, such as glass, aramid, carbon or boron fibers, or any combination thereof and a matrix resin containing significant amounts of powdered graphite, or silica filler.

In a preferred embodiment, the pultruded frame members would use 50%-55% of a vinylester or polyester matrix material containing between 5%-15% of powdered graphite, 30% long fibered glass, 10% aramid fibers, 5% boron, or 10% carbon strand, all percentages being by weight, with a Slush Molding Compound, such as that sold by King Fiberglass under the trade name SMC, used as a wetting agent.

The pultruded channel members 19 would be placed on the resin impregnated layer of fiber reinforcing material with their flanges facing inward, in such a way that if their surfaces were extended they would join. In one embodiment, wherein the core structure 14 would be on the shape of a square or rectangle, channel members 19 would be arranged on the resin impregnated reinforcing material to form three sides of a frame (the left, front and rear sides), with one side open (the right side), thereby describing the area into which the balsa-wood blocks 16 will fit.

End-grain, balsa-wood blocks 16 having a height that will exactly fit into that area described by the inside walls of the pultruded channel members 19 and I-beam members 20 would then be prepared or otherwise obtained.

The balsa-wood blocks 16 would then be grooved or notched (FIGS. 5b and 6) in such a way that when joined with the channel members 19 and the I-beam ribs 20 the top and bottom surfaces of the pultruded members and the top and bottom surfaces of the balsa-wood blocks will form a level planar surface.

The balsa-wood blocks would then be impregnated with a matrix resin 15, preferably the same epoxy, polyester, phenolic or vinylester resin that was used to impregnate the fiber mat on which the framed balsa-wood blocks are supported, and would be allowed to cure at temperatures on the order of between about 70 F. and about 130 F., so that the individual balsa-wood blocks are dried throughout. In a preferred embodiment, the same matrix resins used in the formation of the pultruded members would be used to saturate the balsa-wood blocks and to impregnate the fiber mat which will ultimately form the skin 17 that covers the framed balsa-wood blocks.

Next, the entirety of the inside walls of the pultruded channel member 19 forming the left side of the frame, and a portion of the inside walls of the rear side channel member, i.e., a portion about the width of the balsa-wood blocks 16, would be coated with a layer of resin matrix material 15, preferably the same resin matrix material used to form the pultruded members, so that excess resinous material remains on all coated inside wall surfaces of the pultruded members.

The balsa-wood blocks 16 would then be re-wet with the same resinous material previously used.

A first block of the re-wetted impregnated balsa-wood blocks would then be positioned in a corner of the frame, e.g., the left rear corner, so that one of its grooved or notched sides fits into the resin wet section of the back channel member, and one notched side fits into the resin wet section of the left side channel member. The block would be manipulated during the positioning step to ensure that no voids or entrapped or occluded air remains between the inner walls of the channel members and the rear and left side walls of the balsa-wood block.

Working in a direction that will be parallel to the placement of the I-beam rib members 20, i.e., from the left rear to the left front of the frame, the second and subsequent balsa-wood blocks 16 in that row would then be positioned so that one grooved or notched side fits into the resin wet section of the side channel member 19 in such a way as to cover all surfaces of the inside area described by the channel walls. As with the positioning of the first block, care would be taken to ensure that no voids, or entrapped or occluded air remains between the inner walls of the left side channel member 19 and the mutually opposing side walls of the second and subsequent balsa-wood blocks, and such that the space between the balsa-wood blocks is about 1/64 to about 7/16 of an inch, e.g., 1/32 of an inch.

After the first row or column of balsa-wood blocks have been positioned along the side channel member, a rib or dividing member would be put in place. In one embodiment, this is accomplished by completely covering the inside walls of an I-beam 20 with a resinous material, and then fitting resin-wet balsa-wood blocks 16 between the flanges of the I-beam such that (1) all surfaces of the inside area described by the right side of the I-beam walls are covered, (2) such that no voids or entrapped or occluded air remains between the inner walls of the I-beam member and the mutually opposing side walls of the balsa-wood blocks, (3) such that the space between the balsa-wood blocks is from about 1/32 of an inch, and (4) such that a notched side balsa-wood block extends beyond the front and rear ends of the I-beam for positioning, respectively, into the openings in the front and rear channel members 19. The I-beam, together with the blocks fitted along the right side thereof, would then be positioned parallel to the left channel member 19 and would be moved toward that left channel member until the right side of each block 16 that is fitted in the left channel member is fitted between the flanges on the left side of the I-beam. This procedure would be continued until the entire area described by the three side frame is filled with balsa-wood blocks 16 and pultruded I-beams 20, and such that the only voids remaining are those that are between the balsa-wood blocks 16 running at a 90 angle to the I-beam ribs 20.

The three sided frame containing the balsa-wood blocks 16 is then closed. This can be accomplished by first cutting a pultruded channel member 19 to the length of the balsa-wood blocks 16 remaining exposed at the open end of the three sided channel frame. This pultruded channel member 19 should be long enough to just touch the pultruded channel members that form the front and rear sides or ends of the frame. The inside walls of the last (right side) channel member 19 are then wet with the same resinous material 15 previously used to wet the other three channel members, and the frame is closed in such a manner as to ensure that the top and bottom surfaces of the channel members 19, I-beams 20 and the balsa-wood blocks 16 are level, and that no voids or entrapped or occluded air remain between the inside walls of the right side channel member and the walls of the balsa-wood blocks.

Next, a resinous material 15, preferably the same resinous material that is used in the previous steps, is applied to the top surface of the framed balsa-wood blocks and is force downwardly so that the resinous material completely fills the spaces remaining between the balsa-wood blocks. This latter step should be performed to ensure that no voids or entrapped or occluded air remains between the balsa-wood blocks.

The resin saturated, fiber reinforced mat that is positioned on the planar support surface under the framed balsa-wood blocks is then folded upwardly so as to completely overlap or cover the outside walls of the channel members 19 defining the framed balsa-wood blocks 16, but so as not to extend onto the top surface of the framed blocks.

A second layer of fiber reinforcing material, such as 1.5 oz. per square foot matting is then cut to size such that when it is placed on top of the framed balsa-wood blocks and is folded downwardly over the edges of the framed members, it will overlap the perimeter and the vertical side walls of the framed balsa-wood blocks, but will not overlap onto the bottom surface thereof.

The second cut fiber mat is then impregnated with the same matrix resin that was used to saturate the first fiber reinforced mat, and is placed over the top of the framed balsa-wood blocks.

The fiber reinforced mat is then folded downwardly so that the balsa-wood blocks are completely encased, and is stapled in several areas to hold the mat to the blocks.

The framed, and mat encased, balsa-wood blocks are then cured at a temperature of between about 70 F. and about 150 F., preferably about 110 F. for about ¼ to about 1 hour so that the fiber reinforced mat on the top, bottom and sides of the framed balsa-wood blocks forms a unitary skin 17 which completely encases the framed blocks.

After the resin matrix in the skin layer 17 which surrounds the framed balsa-wood blocks has properly cured, the partially completed core is then covered with an elastomeric layer or membrane 18. The elastomeric material preferably comprises a free flowing elastomeric material such as an organosol mixture of thermoplastics or synthetic rubber-based substances. While there are a number of such elastomeric materials commercially available, in a preferred embodiment of this invention, the elastomeric material would be prepared by the fabricator from materials that are commercially available. Thus, the elastomeric material may contain one or more of such materials as polyvinyl chloride, polyvinyl acetate, styrene-butadiene rubber, butyl rubber, neoprene or nitrile synthetic rubber in an organosol mixture.

The organosol mixture typically would be comprised of about 100 parts, by weight, of polyvinyl chloride in compatible plasticizers, such as 25 parts dioctyl phthalate and 25 parts dibutyl sebacate, with between about 0.1 to about 10%, by weight of pigments and stabilizers.

To this mixture there would be added 5-15%, by weight, of a finely ground silica, such as those marketed under the names of CAB-O-SIL and AER-O-SIL.

The organosol mixture would be coated on the skin layer 17 on the exposed sides and top of the skin encased, framed, balsa-wood blocks so that when dried, it will form an elastomer skin or membrane 18 of between about 1/32 of an inch and ⅛ of an inch. After the coated surfaces of the partially completed core structure have dried, the core structure is turned over and the bottom surface thereof is similarly coated with the elastomeric material. When this step is completed, all of the external surfaces of the mat encased, and framed, balsa-wood structure will be completely covered by an elastomeric skin or membrane 18, and the resulting product is the completed core structure 14.

After the core structure 14 has been prepared by the fabricator as outlined above (or after a similarly prepared core structure has been obtained from another source), a second layer of resin impregnated fiber reinforcing material, such as 1.5 oz. per square foot matting of the same type previously used, is layed-up on the surface of the upper skin layer 12.

Next, using the same elastomeric compound that is used to form the elastomeric skin or membrane 18 on the core structure 14, and just prior to the positioning of the core structure on the upper skin layer 12, there is applied to that section of the upper skin layer 12 over the newly applied resin impregnated mat a layer 18' of elastomeric material such that all exposed surfaces are evenly covered and such that no voids, entrapped or occluded air remains. The elastomeric compound should be spread in a manner such that when it will have a relatively uniform thickness of between about 3 mills and about ⅛ inch thick. A preferred thickness would be about ⅛ of an inch.

The core structure 14 is then positioned in a depression 27 provided in the upper skin layers 12 and on the free flowing elastomeric compound 18' (FIG. 9) so that a layer of elastomeric material 18' will remain between the core structure 14 and the newly applied resin impregnated fiber reinforcing material on upper layer of skins 12, but in such a way that no voids, entrapped or occluded air remains between the core structure and the top surface of the upper layer of skins. The perimeter of the core structure 14 should be spaced between about ⅛ inch and about 6 inches from the side walls of the mold 22, preferably between 1 and 3 inches.

Using the free flowing elastomeric compound 18', all exposed surfaces of the core structure 14 are then covered so that, when at rest, the elastomeric compound 18' forms a second elastomeric skin or membrane having a thickness between about 3 mils and about ⅛ inch. A preferred thickness is about ⅛ of an inch. In the completed panel 10 the elastomeric layer 18' is fused to the elastomeric layer or skin 18 that encases the completed core structure 14 and is essentially indistinguishable therefrom. Accordingly, the layers 18' and 18 can be considered to be a single elastomer skin designated by numeral 18.

Next (FIG. 10), the lower fiber reinforced resin skin layer 11 is prepared by laying-up a plurality of layers of resin impregnated fiber reinforcing material, e.g., three layer, wherein the first layer comprises a 1.5 oz. per square foot fiberglass matting, wherein the second layer comprises 36 oz. per square yard fiberglass roving, and wherein the third layer comprises another 1.5 oz. per square foot fiberglass matting in a manner similar to that when preparing the upper skin layer 12, except that the lower skin layer 11 is layed-up over the core structure 14 and the elastomeric compound 18'.

The lower skin layer 11, i.e., those resin impregnated fibrous layers layed-up on top of the positioned core structure 14, are then cured at a temperature of between 50 F. and 150 F., preferably between 70 F. and 130 F., for about ¼ to about 1 hour, and the edge portions 26 of the panel 10 are built-up using resin wet 2 oz. per square yard fiberglass matt blotter. Once built, the edges are filled with resin wet continuous fiber strand, such as that sold by PPG industries under the designation HB600-205-HT50.

After setting for another ¼ to 1 hour, depending upon the ambient temperature in which the panel is placed, the lower skin lay-up is built up further with additional layers of resin wet reinforcing material. The additional layers may comprise, e.g., in order, 1.5 oz. per square foot matting, 36 oz. per square yard roving, and 1.5 oz. per square foot matting.

The resin wet layers are then allowed to cure further for about ¼ to about 1 hour, again depending upon the ambient temperature in which the panel is placed. Any flashing is trimmed, and the resulting lower skin layer 11 is ground, or polished, so that its surface is flat.

A final gel coat layer is then applied to the back of the lower skin layer 11, and the completed panel 10 is removed from the mold 22 and is allowed to cure at a temperature on the order of about 50 F. to about 150 F., preferably between 70 F. and 130 F. for at least 12 hours.

Composite structural panels prepared in the manner outlined above are particularly suitable for use as roadway opening cover plates and when such use is contemplated, the panels are provided with tapered edge portions 26. The composite structural panel may be adhered to a roadway surface adjacent to a roadway opening by means of a mastic or other adhesive. In a preferred embodiment, the composite structural panel is provided with suitably located anchor holes 28 (FIG. 1) for receiving spikes, or anchoring bolts and/or other suitable anchoring mechanisms for anchoring the panel over a roadway opening. The anchor holes 28 may be located, for example, at the corners of a square or rectangular panel, or through the peripheral edge portion of a circular panel, and should be large enough to receive an appropriate anchor such as ⅝ inch square spike or a bolt, at least ⅝ inch in diameter. Anchor holes on the order of from about ¾ inches to about 1.5 inches in diameter would be suitable.

A typical construction panel prepared in accordance with this invention and adapted for use a shoring panel would be between about 2 feet and about 6 feet wide, by between about 4 feet and about 10 feet long, and between about ¼ inch and about 4 inches thick. Such a construction panel would be characterized as having an ability to withstand compression forces in a direction perpendicular to the thickness of the panel on the order of at least about 20,000 psi.

A typical composite roadway panel prepared in accordance with this invention would be between about 4 feet and about 6 feet wide, by between about 6 feet and about 8 feet long, by between about 1.34 inches and about 2 inches thick, and would have a six inch wide edge portion that tapers down to about ¼ inch in thickness. The tapered edge portion 26 may thus function as a ramp. Such a panel would weigh less than 200 lbs., normally between about 155 lbs. to 190 lbs., and would be characterized by an H2O rating (AASHTO rating which means that it has the ability to carry a 32,000 lb. static axle load and a 41,600 impact load with a 3:1 safety factor) even when supported by 12 inches on only 2 sides, thus giving it the strength needed to safely cover ground holes or openings in heavily trafficked roadway surfaces.

Because of its light weight, roadway opening covers prepared in accordance with the present invention would significantly reduce the cost of covering a hole, or opening, in roadway surfaces carrying vehicular traffic, and would significantly increase the work flow process, for example, by as much as 30% or more. Roadway opening covers of this type could be delivered to a job site in a conventional van or pick-up truck and would not require any special equipment and attendant crew; nor would they require any special crew standing by at a job site to move the plates. Such roadway covers could be distributed to emergency sites quickly and at minimum expense, and could be easily handled by two people. The roadway covers of the present invention can be used safely in areas where vehicular traffic moves at speeds up to 55 miles per hour and would safely span holes in excess of 4 feet wide without presenting a severe hazard to oncoming traffic. Moreover, the present light weight roadway opening covers eliminate many of the safety problems and attendant costs associated with the currently used steel plates, e.g., workman's compensation claims and traffic accidents, and they also overcome the problems of thickness that limited the use and, therefore, the benefits of existing light weight roadway covers, such as the cover describe in U.S. Pat. No. 4,801,483.

It is to be understood that the above-described embodiment are simply illustrative of the principles of the invention, and that various other modifications and changes made by those skilled in the art which will embody the principles of the invention and fall within the scope thereof as set forth in the following claims:

What is claimed is:

1. A structural composite panel, which comprises:
   (a) a substantially flat lower skin layer;
   (b) an upper skin layer which is spaced from said lower skin layer and which extends substantially parallel thereto; and
   (c) at least one core structure disposed between said skin layers and integrally bonded thereto such that said upper and lower skin layers and said core structure define a substantially monolithic composite panel, said core structure comprising:
      (i) a plurality of cellular core members arranged adjacent to each other and extending along the length of said panel substantially parallel to said upper and lower skin layers thereof,
      (ii) frame means integrally bonded to said cellular core members,
      (iii) skin means integrally bonded to and completely encasing said cellular members and said frame means, and
      (iv) an elastomeric membrane layer integrally bonded to and completely covering said skin means;
   wherein said upper and lower skin layers and said skin means of said core structure comprise a fiber reinforced resin matrix;
   wherein said cellular core members and said frame means are integrally bonded to each other and to said skin means; and wherein said upper skin and lower skin layers are integrally bonded to said core structure so as to form a substantially air bubble-free, monolithic composite panel having an internally disposed shock absorbing elastomeric membrane and having an ability to carry a static axle load of 32,000 pounds and an impact load of 41,600 pounds with a 3:1 safety factor even when said panel is supported only on two sides while spanning a ground opening.

2. The structural composite panel of claims 1, wherein said frame means comprises side members which define the peripheral boundaries of said core structure and separator members which separate said cellular core members into discrete areas within said core structure,
wherein said side members and said separator members are integrally bonded to said cellular core members,
wherein said core members have substantially flat upper and lower surfaces arranged substantially parallel to said upper and lower skin layers, and
wherein each of said side members and said separator members has substantially flat upper and lower surfaces which cooperate with said flat upper and lower surfaces of said cellular core members to define a continuous flat surface which is bonded to said skin means.

3. The structural panel of claim 2, wherein a peripheral edge portion of said panel is tapered such that the thickness of said edge portion decreases when measured away from the center and toward the periphery of said panel, said tapered edge portion defining a ramp-like incline adapted to facilitate vehicular traffic over said panel.

4. The panel of claim 3, wherein said tapered edge portion is provided with at least one hole therethrough, said hole being adapted to receive means for anchoring said panel over a ground opening.

5. The panel of claim 4, wherein said monolithic composite comprises a generally square rectangular or circular configuration.

6. The panel of claim 5, wherein said cellular core members comprise balsa-wood blocks.

7. The panel of claim 6, wherein said balsa-wood blocks have a length of from about ¼ inch to about 4 inches, a width of from about ¼ inch to about 4 inches, and a thickness of from about ¼ inch to about 4 inches.

8. The panel of claim 7, wherein said balsa-wood blocks are spaced from each other to define a channel-shaped space between adjacent blocks that is from about 1/64 to about 7/16 inches thick, said space being filled with a hardenable resin material.

9. The panel of claim 2, wherein said side members and said separator members are comprised of a fiber reinforced hardenable resin material, and wherein said resin in selected from the group consisting of epoxies, phenolics, nylons, polyesters, polyurethanes and polysulfones.

10. The panel of claim 9, wherein said elastomeric membrane layer comprises an elastomeric material selected from the group consisting of polyvinyl chloride-polyvinylidine chloride copolymers, styrene-butadiene rubber, butyl rubber, neoprene rubber, silicone rubber, ethylene-propylene copolymers or terpolymers, and polyurethane rubber.

11. The structural panel of claim 1, wherein a peripheral edge portion of said panel is tapered such that the thickness of said edge portion decreases when measured away from the center and toward the periphery of said panel, said tapered edge portion defining a ramp-like incline adapted to facilitate vehicular traffic over said panel.

12. The panel of claim 11, wherein said tapered edge portion is provided with at least one hole therethrough, said hole being adapted to receive means for anchoring said panel over a ground opening.

13. The panel of claim 12, wherein said monolithic composite comprises a generally square, rectangular or circular configuration.

14. The panel of claim 13, wherein said cellular core members comprise balsa-wood blocks.

15. The panel of claim 14, wherein said balsa-wood blocks have a length of from about ¼ inch to about 4 inches, a width of from about ¼ inch to about 4 inches, and a thickness of from about ¼ inch to about 4 inches.

16. The panel of claim 15, wherein said balsa-wood blocks are spaced from each other to define a channel-shaped space between adjacent blocks that is from about 1/64 to about 7/16 inches thick, said space being filled with a hardenable resin material.

17. The panel of claim 1, wherein said resin matrix comprises a hardenable resin material selected from the group consisting of epoxies, phenolics, nylons, polyesters, polyurethanes and polysulfones.

18. The panel of claim 17, wherein said elastomeric membrane layer comprises an elastomeric material selected from the group consisting of polyvinyl chloride, polyvinyl acetate, polyvinyl butyral, polyvinyl chloride-polyvinylidine chloride copolymers, styrene-butadiene rubber, butyl rubber, neoprene rubber, silicone rubber, ethylene-propylene copolymers or terpolymers, and polyurethane rubber.

19. The panel of claim 1, wherein said elastomeric membrane layer comprises an elastomeric material selected from the group consisting of polyvinyl chloride, polyvinyl acetate, polyvinyl butyral, polyvinyl chloride-polyvinylidine chloride copolymers, styrene-butadiene rubber, butyl rubber, neoprene rubber, silicone rubber, ethylene-propylene copolymers or terpolymers, and polyurethane rubber.

20. The panel of claim 1, wherein said panel is adapted for use as a shoring panel and is characterized by an ability to withstand compression forces in a direction perpendicular to the thickness thereof on the order of at least about 20,000 psi.

21. The panel of claim 20, having a length of between about 4 feet and 10 feet, a width of between about 2 feet and 6 feet, and a thickness of between about ¼ inch and 4 inches.

22. A process for preparing a substantially monolithic composite structural panel which is capable of carrying a static axle load of 32,000 pounds and an impact load of 41,600 pounds with a 3:1 safety factor even when said panel is supported only on two sides while spanning a ground opening, which comprises the steps of:
applying a release coating to the inner bottom surface of a mold;
applying a gel coat on said release coating;
applying one or more first layers of resin impregnated fibrous reinforcing material on the gel coat in said mold;
curing said gel coat and said first resin impegnated fibrous reinforcing material to form a hardened first skin layer on said release coating;

coating a first portion of the exposed surface of said first skin layer with an elastomeric composition;

positioning a core structure on said elastomeric composition in such a manner as to exclude the formation of voids or occluded air between said elastomeric composition and said core structure;

coating the entire exposed surface of said core structure with an elastomeric composition;

applying one or more second layers of resin impregnated fibrous reinforcing material over the elastomeric material-coated core structure and over all remaining exposed portions of said first skin layer, in such a manner as to exclude the formation of voids or occluded air; and curing said second layers of resin impregnated fibrous reinforcing material to form a second skin layer and to integrally bond said first skin layer, said elastomeric composition, said core structure and said second skin layer into a substantially monolithic composite panel having a hardened central core and a hardened exterior surface which are interfaced with an impact absorbant elastomeric membrane.

23. The process of claim 22, which further comprises the step of forming said panel in a mold having depressions in its inner bottom surface which correspond to raised anti-skid tread-like projections on the surface of said panel which is formed against said inner bottom surface of said mold.

24. The process of claim 23, which comprises the step of building up at least one peripheral edge portion of said first skin layer with fiber reinforced resin material which is separate from said second layers of said resin impregnated fibrous reinforcing material so as to define, in said cured composite panel, a tapered, ramp-like edge portion which deceases in thickness from the more interior regions of said panel to the more peripheral regions thereof.

25. The process of claim 24, further comprising the step of forming at least one hole through said tapered edge portion, wherein said hole is adapted to receive means for anchoring said panel to a support.

* * * * *